SAMPLED CLIPPED SPEECH TDM TRANSMISSION SYSTEM

Original Filed Nov. 27, 1962

INVENTOR.
FRANK H. SLAYMAKER
BY George J. Seligsohn
ATTORNEY

United States Patent Office
3,505,601
Patented Apr. 7, 1970

3,505,601
SAMPLED CLIPPED SPEECH TDM TRANSMISSION SYSTEM

Frank H. Slaymaker, Rochester, N.Y., assignor to General Dynamics Corporation, Rochester, N.Y., a corporation of Delaware Continuation of application Ser. No. 240,327, Nov. 27, 1962. This application Oct. 4, 1966, Ser. No. 593,256
Int. Cl. H04b *1/00, 7/00*
U.S. Cl. 325—38 7 Claims

ABSTRACT OF THE DISCLOSURE

A system for transmitting and receiving speech is described. The speech signal is passed through a very sharp cutoff low pass filter and is differentiated and infinitely limited. The signal is also sampled at a sampling frequency which is at least twice that of the high frequency cutoff of the filter. The sampled signal may be multiplexed with signals from other channels and transmitted via a TDM link to a receiving point.

The present application is a continuation of an application entitled Clipped Speech Transmission System, Ser. No. 240,327, filed Nov. 27, 1962 now abandoned and owned by the assignee of the present invention.

The present invention relates to an information transmission circuit and more particularly to a clipped speech transmission system.

In recent years it has been found desirable, especially in military applications, to be able to transmit digitally coded information which is readily convertible into intelligible speech. One such arrangement which is especially suitable for this end is a clipped speech system. A clipped speech system may operate in the following manner: The original voice circuit is differentiated, the differentiated signal is infinitely clipped or limited and the clipped signal sampled, so samples of a fixed positive amplitude level are obtained from all positive samples and of a fixed negative amplitude for all negative samples. Stated in another way, after limiting, each of the samples are, in fact, digital pulses which manifest in binary form only the polarity of each of the samples of the differentiated signal.

After being transmitted to a receiving point over the transmission channel, these digital pulses are applied to a pulse polarity detector, i.e., a device which produces a first level so long as successive received pulses manifest a first polarity and a second level so long as succesesive pulses manifest a second polarity. The output of the pulse polarity detector is then applied to an integrating circuit which produces a reconstructed signal which is supposed to represent the original signal.

Unfortunately, it has been found in practice that the reconstructed speech signal includes extraneous inharmonic related frequencies which sound like noise or distortion. Licklider, as set forth in his article in the Journal of the Acoustical Society of America, p. 820 (November 1950), in an attempt to overcome these problems devised a series of rules in connection with a sampling technique which, although effective, are somewhat complicated and difficult to realize in practice.

In view of the foregoing, it is an object of the present invention to overcome the preceding problems and provide an improved clipped speech system.

It is still a further object to provide an improved clipped speech transmission system.

It has been found that the deficiencies of the prior clipped speech systems may be substantially limited, and a more effective clipped speech system realized if the signal which has been differentiated and infinitely limited is then sampled at a frequency which is at least twice that of the highest frequency component of the unidifferentiated input signal. Moreover, it has been found most effective to initially pass the input signal through a low pass filter which has a sharp cutoff at one half the sampling frequency.

It is a feature of this invention that a clipped speech system made in accordance therewith is particularly suitable for use with time division.

These and other objects, features and advantages of the present invention will become more apparent from the following description taken together with the accompanying drawing in which.

Figure 1:
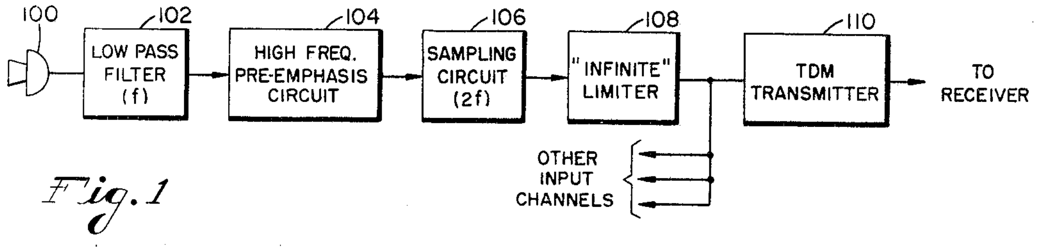
FIG. 1 is a first embodiment of the transmitting portion of this invention.

Referring now to FIG. 1, the output of a speech source, such as microphone 100, is applied as an input to low-pass filter 102. Low-pass filter 102 has a very sharp cutoff at frequency $f$, which is one-half the sampling rate. The output of low-pass filter 102 is applied as an input to high-frequency pre-emphasis circuit 104, which is a differentiating circuit for differentiating the signal applied thereto. The output of high-frequency pre-emphasis circuit 104 is applied as an input to sampling circuit 106, which samples the input thereto to produce amplitude-modulated output pulses at a repetition rate equal to $2f$. The output pulses of sampling circuit 106 are applied to "infinite" limiter 108, which is responsive to all positive and negative pulses from sampling circuit $2f$ which have an amplitude higher than the background noise. Any positive output pulse from sampling circuit 106, which has an amplitude higher than the background noise, is amplified and clipped by "infinite" limiter 108 to produce at the output of "infinite" limiter 108 to produce at the output of "infinite" limiter 108 positive pulses of a fixed signal level which are independent of the actual level of the positive input pulses from sampling circuit 106 to "infinite" limiter 108. In a similar manner, "infinite" limiter 108 produces fixed level negative output pulses therefrom in response to any negative pulse applied as an input thereto from sampling circuit 106. The output of "infinite" limiter 108 is applied as an input to time division multiplex transmtter 110 in multiple with the output of other input channels, each element of the other input channels corresponding to microphone 100, low-pass filter 102, high-frequency pre-emphasis circuit 104, sampling circuit 106, and "infinite" limiter 108. Each of the channels is sampled sequentially by the sampling circuit thereof during each frame period of $1/2f$, i.e., the samples from the various channels are phase displaced with respect to each other.

Figure 2:
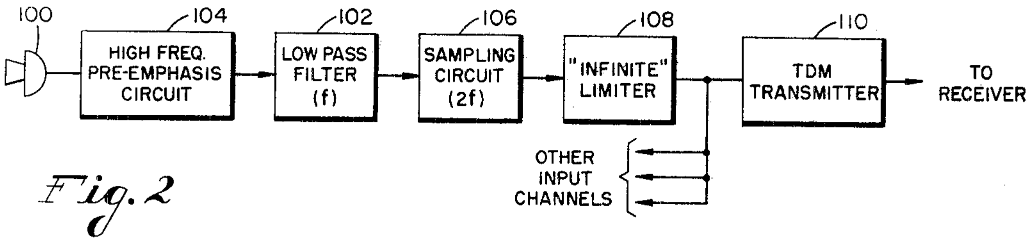
FIG. 2 is a second embodiment of the transmitting portion of this invention.
Figure 3:
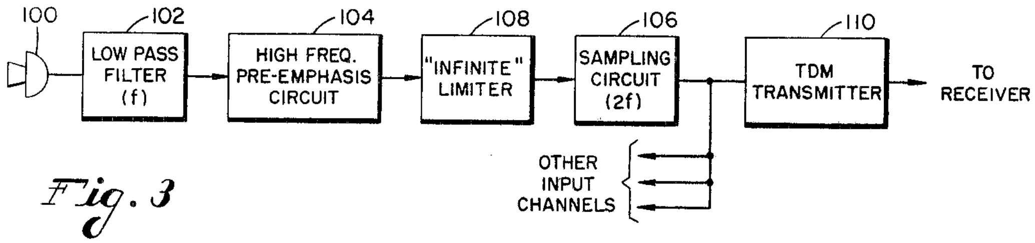
FIG. 3 is a third embodiment of the transmitting portion of this invention.
Figure 4:
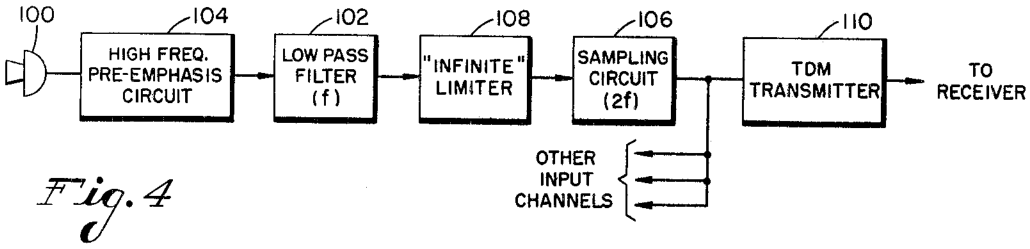
FIG. 4 is a fourth embodiment of the transmitting portion of this invention.

As shown in the embodiments of FIGS. 1 and 2, the relative positions of low-pass filter 102 and high-frequency pre-emphasis circuit 104 within the channel may be interchanged. Similarly, as shown in the embodiments of FIGS. 1 and 3, the relative positions of sampling circuit 106 and "infinite" limiter 108 within the channel may be interchanged. However, in all cases, the signal from microphone 100 must be passed through sharp-cutoff low-pass filter 102 prior to being sampled by sampling circuit 106.

Figure 5:
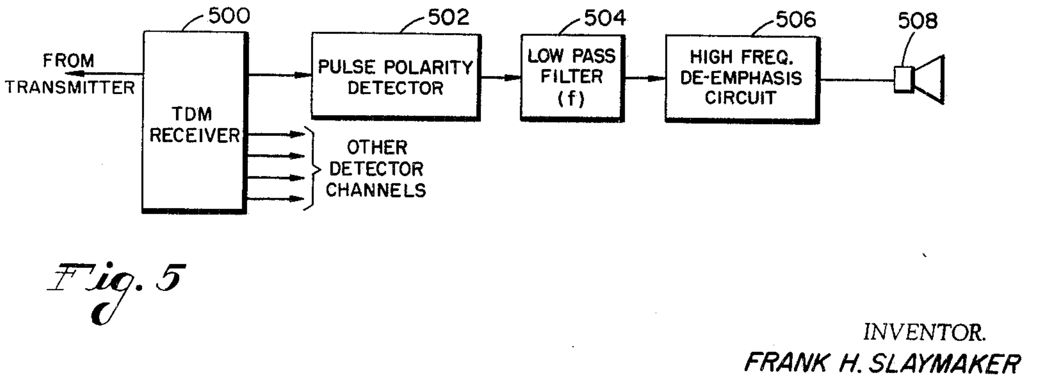
FIG. 5 is a preferred embodiment of the receiving portion of this invention which may be used with the transmitting embodiment shown in any of FIGS. 1–4.

The output of time division multiplex transmitter 110 is transmitted from the transmitting point to a receiving point by wire transmission, radio transmission, etc., where it is applied as an input to time division multiplex receiver 500, shown in FIG. 5. Time division multiplex receiver 500 separates the various signal channels to demultiplex them and separately applies each channel signal to a pulse polarity detector, such as pulse polarity detector 502. Pulse polarity detector 502, which may consist of a bistable device, such as a flip-flop, is switched from one stable state thereof to another by the first pulse of positive polarity which follows one or more consecutive pulses of negative polarity. It remains in this other stable state in response to further consecutive pulses of positive polarity, but is switched back to its original stable state in response to the first pulse of negative polarity which follows one or more consecutive pulses of positive polarity. It will, therefore, be seen that the output of pulse polarity detector 502 is a pulse-width modulated square wave.

The output of pulse polarity detector 502 is then applied as an input to low-pass filter 504 having a cutoff frequency of *f*. The output of low-pass filter 504 is then applied as an input to high-frequency de-emphasis circuit 506 which is an integrating circuit for providing an output which is an integral of the input applied thereto. The output of high-frequency de-emphasis circuit 506 is then applied to a utilization means, such as transducer 508, for instance.

Each of the other detector channels is identical in structure and function to the above-described channel consisting of pulse polarity detector 502, low-pass filter 504, high-frequency de-emphasis circuit 506, and transducer 508.

What is claimed is:

1. A clipped speech transmission system comprising a source of speech signals which includes frequency components up to a given frequency *f* and may include frequency components above said given frequency and input terminal, and *f*, first means including a low-pass filter having a sharp cutoff at said given frequency *f* connected in tandem to a high frequency differentiating circuit which produces an output therefrom which is proportional to the first derivative of the input applied thereto, second means for applying said speech signal from said source to the input terminal of said first means, third means including an input terminal, and a sampling circuit for periodically sampling an input signal applied thereto at no less than twice said given frequency *f*, so that said input signal applied thereto is sampled at no less than twice the highest frequency *f* passed by said low-pass filter notwithstanding that said applied input signal may include frequency components above said frequency *f*, said sampling circuit connected in tandem to an "infinite" limiter, fourth means for applying the output of said first means to the input terminal of said third means so that said low-pass filter, said differentiating circuit, said sampling circuit and said infinite limiter are all connected in tandem with each other, and fifth means for transmitting the output of said third means to a receiving point.

2. The system defined in claim 1, wherein said second means applies said speech signal from said source to the input of said filter, and wherein said fourth means applies the output of said differentiating circuit to the input terminal of said third means.

3. The system defined in claim 1, wherein said second means applies said speech signal from said source to the input of said differentiating circuit, and wherein said fourth means applies the output of said filter to the input terminal of said third means.

4. The system defined in claim 1, wherein said fourth means applies the output of said first means as an input to said sampling circuit, and wherein the output of said limiter is applied to said fifth means.

5. The system defined in claim 1, wherein said fourth means applies the output of said first means as an input to said limiter, and wherein the output of said sampling circuit is applied to said fifth means.

6. The system defined in claim 1, further including sixth means at said receiving point for reconstructing that portion of said speech signal defined by only those frequency components up to said given frequency *f*, said sixth means including a low-pass filter having a sharp cutoff at said given frequency *f*.

7. The system defined in claim 6, wherein said sixth means further includes means for receiving the signal transmitted by said fifth means connected in tandem to pulse polarity detecting means which is in tandem with said low-pass filter which is in tandem with a high-frequency integrating circuit.

References Cited

UNITED STATES PATENTS

| | | | |
|---|---|---|---|
| 3,125,723 | 3/1964 | Spogen et al. | 325—38 |
| 3,136,949 | 6/1964 | Firestone | 325—30 X |
| 3,327,063 | 6/1967 | Remley | 325—42 X |

OTHER REFERENCES

Licklider and Pollack: "Effects of Differentation, Integration, and Infinite Peak Clipping Upon The Intelligibility of Speech," vol. 20, J. Acous. Soc. of Amer., January 1948, pp. 42–51.

ROBERT L. GRIFFIN, Primary Examiner

J. A. BRODSKY, Assistant Examiner

U.S. Cl. X.R.

179—1, 15; 325—141; 332—15